United States Patent [19]

Silcox et al.

[11] Patent Number: 4,580,761
[45] Date of Patent: Apr. 8, 1986

[54] ELECTRIC VALVE DEVICE HAVING A ROTATABLE CORE

[75] Inventors: William H. Silcox, San Francisco; Judson S. Kuehn, San Rafael; James A. Bodine, Walnut Creek, all of Calif.

[73] Assignee: Chevron Research Company, San Francisco, Calif.

[21] Appl. No.: 655,393

[22] Filed: Sep. 27, 1984

[51] Int. Cl.[4] ............................................. F16K 31/08
[52] U.S. Cl. ................................. 251/129.11; 251/65; 251/141; 251/129.12; 335/222; 335/272
[58] Field of Search ............... 335/222, 223, 272, 279; 251/129, 141, 65, 133, 134

[56] References Cited

U.S. PATENT DOCUMENTS

| | | | |
|---|---|---|---|
| 1,735,753 | 9/1929 | Guenee | 335/222 |
| 1,768,979 | 7/1930 | Guettinger | 335/222 |
| 2,854,607 | 9/1958 | Niklas et al. | 335/222 |
| 3,158,796 | 11/1964 | Musgrave | 335/268 |
| 3,206,160 | 9/1965 | Bennett | 251/137 |
| 3,229,171 | 1/1966 | Daugherty | 335/272 |
| 3,484,074 | 12/1969 | Lynes et al. | 251/65 |
| 4,053,137 | 10/1977 | Raymond | 251/65 |
| 4,089,503 | 5/1978 | Raymond | 251/65 |
| 4,286,767 | 9/1981 | Hashimoto | 251/65 |
| 4,310,023 | 1/1982 | Kah | 137/625.5 |
| 4,345,228 | 8/1982 | Idogaki et al. | 335/222 |
| 4,346,736 | 8/1982 | Inada et al. | 137/625.48 |
| 4,349,045 | 9/1982 | Kah | 137/625.5 |
| 4,350,319 | 9/1982 | Kawata et al. | 251/65 |
| 4,392,632 | 7/1983 | Gast et al. | 251/65 |
| 4,494,517 | 1/1985 | Kratt et al. | 251/133 |

FOREIGN PATENT DOCUMENTS 318950  9/1929  United Kingdom ............... 335/272

Primary Examiner—Margaret A. Focarino
Assistant Examiner—Noah Kamen
Attorney, Agent, or Firm—S. R. LaPaglia; E. J. Keeling; P. L. McGarrigle

[57] ABSTRACT

Generally speaking, the present invention relates to an electromagnetic valve for subsea applications. It comprises a valve body, a rotatable core (with an aperture) located within the valve body (it may be shaped like a plug or a ball), a means for creating a magnetic field located between the valve body and the core and electrically conductive windings wrapped around the rotatable core. The windings are connected to a source of DC power and when energized they cause the core to rotate in one direction or the other depending on the polarity of the DC current.

7 Claims, 4 Drawing Figures

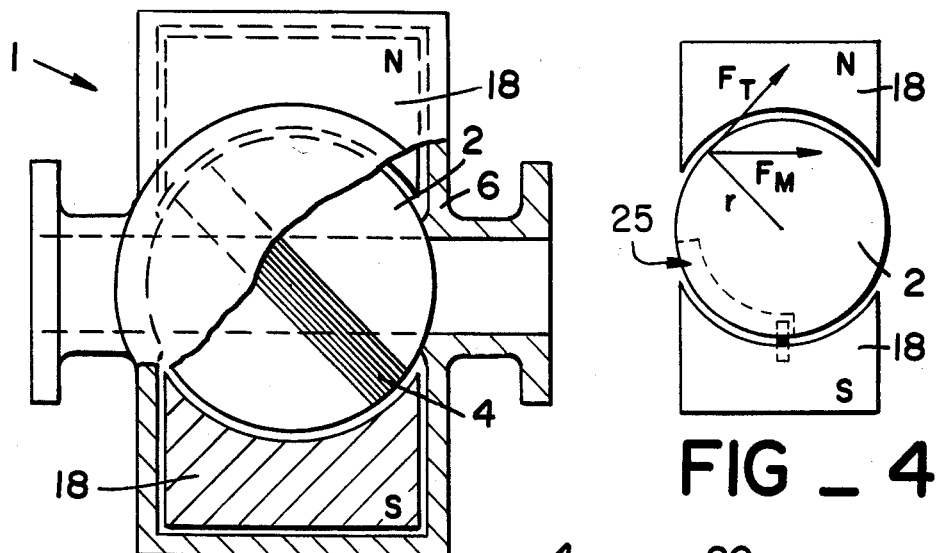
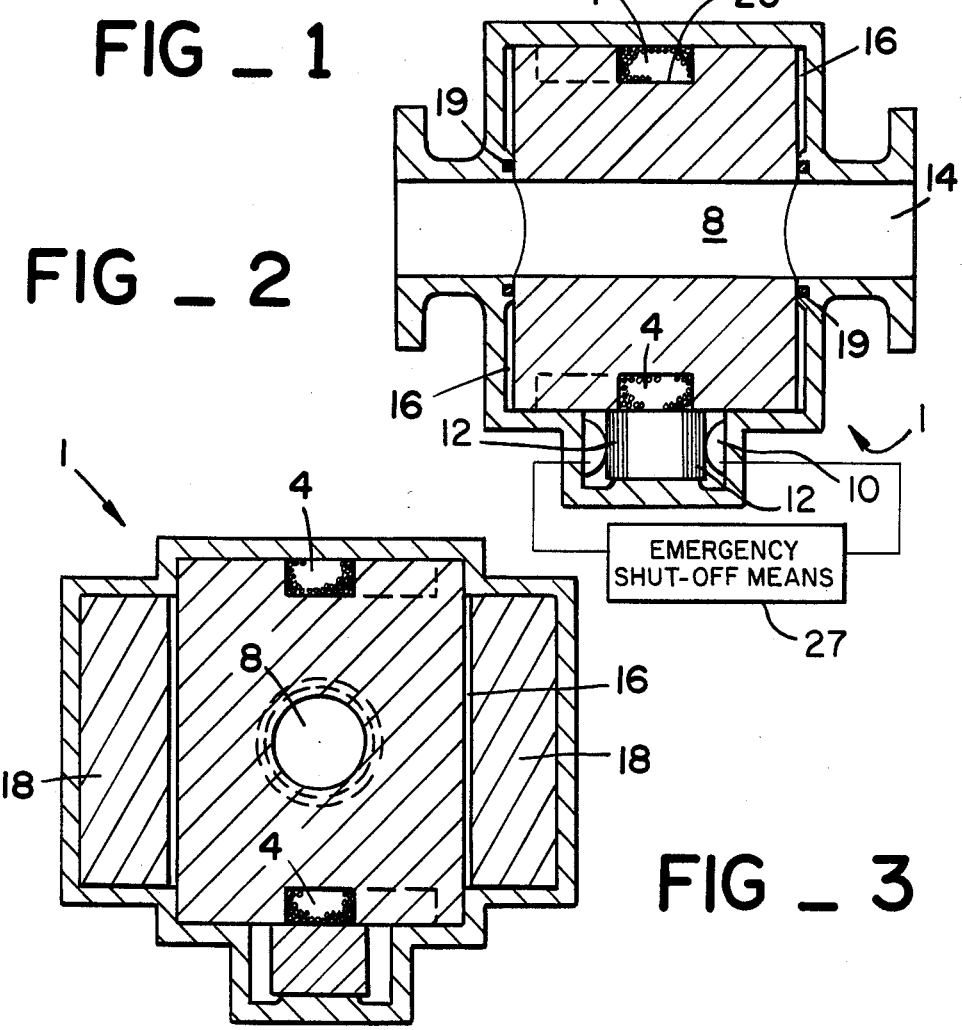
FIG_1
FIG_4
FIG_2
FIG_3

ELECTRIC VALVE DEVICE HAVING A ROTATABLE CORE

CROSS REFERENCE TO RELATED APPLICATIONS

This application is related to copending applications Ser. Nos. 655,391 and 675,104, filed Sept. 27, 1984 and Nov. 20, 1984 respectively, both assigned to the Assignee of this application.

FIELD OF INVENTION

This device relates to electrically actuated flow control devices. More specifically, to electromagnetic valves for use in subsea operations.

BACKGROUND OF THE INVENTION

In oil drilling and producing operations, there exists a need for subsea valves that can be actuated from a remote location. Currently, subsea valves are employed that use hydraulic, manual, or electric controls, but these do not work perfectly for a variety of reasons. For example, hydraulic controls, when operated from a position above the water surface, require long hydraulic control lines which may rupture or suffer delays in actuation. Manually operated valves are likewise imperfect for obvious reasons such as the need for divers or remotely operated vehicles, slow response time, possibly hazardous depths and water conditions, etc. Electric valves that are currently employed in subsea uses are small pilot valves that operate control systems rather than the main flowline. Once the electrically operated pilot valve is triggered, it, in turn, actuates a larger hydraulic valve to control the primary flowline. Since these pilot valves are small, capable of handling only a low fluid volume, and cannot be scaled up to a larger size (as the designs are not linear), they cannot be used in the primary system. Other objections to electric valves, in general, are that some require continuous power in each valve position, they may have components that are susceptible to wear which requires more frequent maintenance, they may be too large and complex, or the time response for actuation may be too slow. Consequently, many of these designs are not feasible for subsea applications.

For these reasons, it is an object of this invention to provide a remotely actuable primary valve that is efficient, highly reliable, and preferably simple. It is a further object of this invention to reduce the subsea valve operator size, decrease the response time, and eliminate the need for costly hydraulic umbilicals.

SUMMARY OF THE INVENTION

Generally speaking, the present invention relates to an electromagnetic valve for subsea applications. The valve is to be used in a main flowline and may be remotely operated by electric or other convenient means. The device generally comprises a ball or plug rotatable core having a central aperture that is placed within a valve body. The valve body has a fluid inlet and outlet and a pair of permanent magnets that are placed on either side of the core with facing opposite poles. In a groove set on the surface of the valve core there is a winding set at 45° to the core aperture in such a way that the core may rotate without any undue friction by the windings. In communication to the windings is a metal strip and a sliding contact, such as DC brushes. This sliding contact connects the windings to a DC power source in order that the windings may be energized. Mechnical stops are provided to prevent over rotation of the valve core.

To operate the valve, a DC current is introduced into the windings. The current increases the magnetic flux on one side of the conductor and reduces it on the other. This causes the wire to move away from the denser field. In this valve configuration the force is generated perpendicular to the lines of magnetic flux between the two magnets. When the vector force tangential ($F_T$) to the valve core is greater than the breakaway friction ($T_B$) the valve will move. To reverse the direction of rotation the DC current polarity is reversed.

Even though the valve is designed to fail in position, an auxiliary motive or driving force may be added to provide fail safe closure.

BRIEF DESCRIPTION OF THE DRAWINGS

FIG. 1 is a cutaway view of the top of the electric valve showing either a cylinder or sphere in a partial cross sectional view;

FIG. 2 is a cross-sectional view of the electric valve as viewed perpendicular to the long axis of the central aperture;

FIG. 3 is a cross-sectional view of the electric valve as viewed down the aperture; and FIG. 4 is a diagram of the forces acting on the electric valve.

DETAILED DESCRIPTION OF THE INVENTION

Referring now to the drawings, FIG. 1 represents a top view of an electromechanical valve 1. A rotatable core 2 is centrally placed within a valve body 6. Even though rotatable core 2 in this embodiment is of the plug type, it must be remembered that a rotatable core of the ball type or some similar design may also be used. Rotatable core 2 has a winding 4 and on either side of the core 2 are magnets 18 with opposite poles. The windings 4 are placed within a groove 20 in rotatable core 2 and are set at 45 degrees to an aperture 8 in the core. An air gap 16 is located around the core 2, which reduces friction during movement of the valve core 2. The windings 4 are connected to a DC power source (not shown) by an attachment to metal contact strips 12, which then communicate with a pair of DC brushes 10. (Even though DC power is discussed, AC power may be used if minor alterations are made in the geometry and design of the valve.)

FIGS. 2 and 3 represent side views of the invention and show some additional features. The DC brushes 10 are used to provide a sliding contact with the windings, however, the same function could be performed by something like a flexible wire. There is an O-ring seal 19 on each side of the core aperture 8 and a means for reversing the polarity of the windings is provided externally to the valve and is not shown here.

To test the feasibility of the device and establish design criteria, the following sets of equations were used:

$$T_B = F_T r$$

where $T_B$ equals the breakaway torque, $F_T$ equals the tangential force, and r equals the radius (see also FIG. 4). To find the magnetic force required, this equation is used:

$$F_m = \frac{F_T}{\cos(45°)}$$

where $F_m$ equals the magnetic force (see FIG. 4).

After solving for $F_m$ the following formula may be used to get the power required to turn the valve:

$$F_m = BLI2N$$

where B equals an arbitrary magnetic field strength in lines/in.$^2$ between the magnets, L equals the length of the conductor in the magnetic field measured in inches, I equals the current in the conductors measured in amps, and N equals the number of turns in the windings.

In referring now to the mode of operation, the plug valve embodiment will be used as a convenient illustration. When the aperture 8 in rotatable core 2 is in a fully opened position (as shown in FIGS. 1 and 2), a DC current of correct polarity is introduced into the windings 4, which causes an electromagnetic force to rotate core 2. Rotation occurs due to the magnetic flux created by the current carrying conductors (the windings 4) within the magnetic field generated by the magnets 18. In this case, the calculations have shown that there is enough magnetic force and current to create sufficient torque to overcome the friction. Once rotation is complete, core aperture 8 will no longer be in communication with the valve aperture 14, and the result will be that the valve 1 will be closed. However, mechanical stops 25 should be added to prevent over rotation of core 2 to a point passed which it may not recover (i.e., when the windings are 90 degrees in relation to the magnetic field or magnetic flux). To open valve 1, once it is closed, a DC current source of reverse polarity is applied to rotate core 2 in an opposite direction. Here, the windings 4 are again rotated by magnetic force so that the valve core 2 will return to its original position. Again, mechanical stops 25 are added to prevent over rotation.

There are essentially two positions in which core 2 may be placed: open, where a core aperture 8 is placed in communication with valve aperture 14; and closed, where core aperture 8 is moved and valve aperture 14 is blocked by the body of core 2. Whatever the position valve core 2 is in, that is the position it would remain until windings 4 are reenergized because power is only used when the core needs to be rotated. As such, this is defined as a fail-in position valve. In the event that direct power to valve 1 is lost, valve 1 may potentially cause a problem by remaining in the permanently open position. However, this may be circumvented to achieve a fail-safe close capability using some form of local battery storage or emergency shut-off means 27 to power the valve 1 closed (see FIG. 2). (This override may also be performed manually or by spring, hydraulic, or pneumatic action.) The type of power loss or switch-over system, now used for emergency lighting, is illustrative of this concept.

Once a subsea tree has these electric valves in place of current hydraulically operated valves, the control cables could be reduced to a single electrical control line with power conductors and a control system. The control line would run from a platform with a control desk to a control pod on the subsea wellhead. The control pod would contain relays or other switching devices to apply DC power to any control wire or any valve. This switching control system would have to allow for applying either polarity to the control wire leads. The control signals could be transmitted over the control line using a MUX (multiplexer) system. However, a potential future embodiment could produce power locally in the subsea environment. Control lines could be eliminated, and the control signals transmitted either acoustically through the seawater or electrically through the control lines or any other means of signal transmission.

Although the invention has been described in detail with reference to a particular illustrative embodiment, it will be understood that all other variations and modifications are possible within the same inventive concept.

What is claimed is:

1. An electric valve comprising:
   a valve body;
   a rotatable core member centrally located within said valve body;
   a pair of permanent magnets located in said valve body with opposite poles facing each other on either side of the rotatable core;
   the rotatable core and permanent magnets substantially occupying the entire space within the valve body;
   wherein an aperture for fluid passage passes through the core, said core has a groove in its exterior surface generally lying in a plane running through the core axis of rotation and at a forty five degree angle to an axis defined by said aperture;
   electrically conductive windings wrapped in said groove;
   a means for reversing the polarity of the windings;
   a means for stopping the rotation of said core member, so that once a DC current of correct polarity energizes said windings the electromagnetic force will cause sufficient torque to overcome the friction placed on the surface of said core and thereby cause said core to rotate and open or close said valve.

2. The electric valve as recited in claim 1 where the rotatable core member is a solid cylinder with an aperture positioned perpendicular to the axis of the cylinder.

3. The electric valve as recited in claim 1 where the core is a solid sphere with an aperture placed therein and a central axis 90 degrees to said aperture.

4. The electric valve as recited in claim 1 where a connection between a DC power source and the windings are DC brushes.

5. The electric valve as recited in claim 1 whereby an emergency shut-off means is provided in the event of a power loss of a power source connected to the valve.

6. An electric valve device for use in subsea applications comprising:
   a valve body having a fluid inlet and fluid outlet;
   a rotatable core member having an aperture that is centrally located within said valve body;
   a pair of permanent magnets placed in said valve body on either side of the core aperture as fully opened; the rotatable core and permanent magnets substantially occupying the entire space within the valve body;
   wherein said core has a groove in its exterior surface generally lying in a plane running through the core axis of rotation and at a forty-five degree angle to an axis defined by said aperture;
   electrically conductive windings wrapped in said groove;

a means comprising a metal strip attached to said windings located on said core for slidably connecting said windings to a DC power source;
a means for reversing the polarity of said windings; and
a means for stopping the rotation of the core, so that, when energized by a DC current of correct polarity, the windings in the core will cause the core to rotate to either open or close the valve.

7. The electric valve as recited in claim 6 whereby an emergency shut-off means is provided in the event of a power loss to of a power source connected to the valve.

* * * * *